United States Patent [19]
Ball et al.

[11] 4,416,695
[45] Nov. 22, 1983

[54] HYDRAULIC CEMENTS

[75] Inventors: Matthew C. Ball; Donald W. Tomkins, both of Loughborough, England

[73] Assignee: National Research Development Corporation, London, England

[21] Appl. No.: 324,656

[22] Filed: Nov. 24, 1981

Related U.S. Application Data

[63] Continuation of Ser. No. 179,984, Aug. 21, 1980, abandoned.

[30] Foreign Application Priority Data

Aug. 22, 1979 [GB] United Kingdom ............... 7929165

[51] Int. Cl.$^3$ .............................................. C04B 7/35
[52] U.S. Cl. ................................................... 106/90
[58] Field of Search ................. 106/90, 314, 89, 97, 106/315

[56] References Cited

U.S. PATENT DOCUMENTS

| | | | |
|---|---|---|---|
| 3,365,319 | 1/1968 | Link | 106/90 |
| 3,459,570 | 8/1969 | Serafin | 106/314 |
| 3,689,294 | 9/1972 | Brunauer | 106/90 |
| 3,959,004 | 5/1976 | Stryker | 106/90 |
| 3,960,582 | 6/1976 | Ball et al. | 106/90 |
| 4,019,918 | 4/1977 | Wills | 106/90 |
| 4,032,353 | 6/1977 | Ball et al. | 106/90 |
| 4,066,469 | 1/1978 | Shiel et al. | 106/90 |
| 4,126,005 | 11/1978 | Coursen | 106/90 |
| 4,160,674 | 7/1979 | Sawyer | 106/89 |

FOREIGN PATENT DOCUMENTS

| | | | |
|---|---|---|---|
| 2227240 | 11/1974 | France | 106/90 |
| 441247 | 9/1974 | U.S.S.R. | 106/90 |

OTHER PUBLICATIONS

Taylor, The Chemistry of Cements, vol. 1, Academic Press, London and New York, 1964, p. 394.
Lea and Desch, The Chemistry of Cement and Concrete, Edward Arnold (Publishers) Ltd., London, 1956, p. 462.

*Primary Examiner*—James Poer
*Attorney, Agent, or Firm*—Oblon, Fisher, Spivak, McClelland & Maier

[57] ABSTRACT

A modified hydraulic cement product comprises a hydraulic calcium silicate-based cement having a Blain surface area of at least 3,000 cm$^2$/g, and/or an iron content of less than 2.5% by weight expressed in terms of the ferric oxide content of the dry cement, in which the cement has been treated with an additive comprising an aldehyde or an amide or substance convertible to an aldehyde or amide under the alkaline conditions prevailing in the cement before or during the setting reaction. Treated cement may be hydrated subsequent to or in parallel with the additive treatment to give hydrated products which characteristically exhibit modified cement morphologies, in particular fibrous cement morphologies, and generally also modified physical strength properties, e.g. tensile strengths of at least about 10 MN/m$^2$ and compressive strengths of at least about 60 MN/m$^2$, as compared with untreated hydrated cement products. The cements may be used with other materials including aggregates and also reinforcing elements and in preferred embodiments may be used in the production of pre-cast units for use in the construction industry. Additionally some treated products prior to hydration exhibit desirable properties: cement slurries with certain aldehydes, e.g. acetaldehyde, providing extrudable cement compositions, and treatment of cements with salicylaldehyde, particularly in the absence of water, providing a quick-set cement composition which may be hydrated subsequently.

29 Claims, 7 Drawing Figures magn. 1.1K magn. 1.1K magn. 5.5K magn 1.1K magn. 1·2K magn. 1·5K

HYDRAULIC CEMENTS

This is a continuation of application Ser. No. 179,984, filed Aug. 21, 1980 now abandoned.

This invention relates to hydraulic cements and in particular to the modification of hydraulic cements by chemical additives.

Hydraulic cements are staple materials of the building industry usually employed in combination with various aggregates to provide concretes and mortars. Such cements include Portland cement and other similar cements which undergo setting reactions on addition of water, involving the hydration of calcium silicate materials, to give strong durable products.

Numerous chemical additives have been proposed for hydraulic cements for modification of either their setting properties or the resultant properties of hydrated products. Amongst these additives, neutralised wood resins as air entraining agents, lignosulphonates as agents for increasing workability and resultant strength, fatty acids and fatty acid salts as adsorption and permeability reducing agents, and recently hydroxycarboxylic acids and polycarboxylic acids as components of plasticiser compositions, have gained widespread commercial acceptance. Over 30 years ago, proposals were made to modify hydraulic cements by addition of water-soluble aldehydes and/or ketones (Belgian Pat. No. 463,851, Penners) and also by addition of mixtures of waste lye of sulphite with at least one water-soluble aldehyde (Swiss Pat. No. 233,795, Heppe) but neither of these proposals appears to have been adopted by the building industry.

It has been found that satisfactory modification of properties of hydrated products can only be achieved, on use of certain additives, if careful attention is paid to the physical and chemical properties of the cement starting material.

According to the present invention a modified hydraulic cement product comprises a hydraulic calcium silicate-based cement having a Blain surface area of at least 3,000 cm$^2$/g and/or an iron content of less than 2.5% by weight expressed in terms of the ferric oxide content of the dry cement, which has been treated with an additive comprising an aldehyde or an amide or substance convertible to an aldehyde or amide under the alkaline conditions prevailing in the cement before or during the setting reaction.

The invention also includes a process for the production of a modified hydraulic cement product comprising treating a hydraulic calcium silicate-based cement as defined above with an additive comprising an aldehyde or an amide or suitable precursor therefore.

The hydraulic calcium silicate-based cements of the invention are typically those whose cementing action predominantly involves the hydration of calcium silicates, including both dicalcium silicate ($C_2S$) and tricalcium silicate ($C_2S$), as distinct from cements whose cementing action relies to a large extent on the hydration of calcium aluminate materials e.g. tricalcium aluminate ($C_3A$), such as the cements commonly known as high alumina cements (HAC). The cements of the invention are usually of Portland type cements including mixtures of Portland type cements with other materials such as blast furnace slag and pozzolana, though other similar cements, whose action relies upon hydration of similar calcium silicate materials, are included within the scope of the invention.

Characteristically, however, the cements of the invention are of fine particle size and/or low iron content and are typically of finer particle size and/or lower iron content than ordinary Portland cement (OPC). Suitable cements of fine particle size are those having a Blain surface area usually greater than 3,500 cm$^2$/g or especially greater than about 4,500 cm$^2$/g or more e.g. up to about 10,000 square centimeters per gramme, and preferred cements include finely ground Portland cement type materials, such as Rapid Hardening cement, Ultra Rapid Hardening cement and "Swiftcrete". Alternatively or in addition, suitable cements typically contain less than about 2.5% by weight, or especially less than about 1% by weight, of iron (expressed in terms of the $Fe_2O_3$ content of the dry untreated cement material i.e. corresponding to a ferrite phase comprising less than about 10% by weight of the dry untreated cement) and particularly preferred cements are low iron content Portland cement type materials such as those known as White Portland cement (WPC) or "Snowcrete".

Aldehydes and amides in general may be used to modify hydraulic cements according to the present invention and preferred aldehydes or amides include simple aldehydes or amides such as simple aliphatic aldehydes e.g. formaldehyde, acetaldhyde, butyraldehyde, or amides e.g. formamide, acetamide. Suitable aldehydes or amides may also include aromatic aldehydes or amides, and both aliphatic and aromatic aldehydes and amides may have further substitutions e.g. o- or p-chlorobenzaldehyde or p-dimethylaminobenzaldehyde, besides the aldehyde or amide carbonyl group. Particularly preferred aldehydes are simple unsaturated aldehydes, in particular conjugated unsaturated aldehydes, especially unsaturated aldehydes including both aromatic e.g. phenyl, and ethylenically unsaturated aldehydes in which the unsaturation is conjugated with respect to the aldehyde carbonyl group, for instance, crotonaldehyde, and salicylaidehyde. Examples of aldehydes which have been found to be useful in practice for modification of hydraulic cements are: formaldehyde, paraformaldehyde, acetaldehyde, butyraldehyde, heptaldehyde, acrolein, crotonaldehyde, cinnamaldehyde, salicylaldehyde, ortho and para chlorobenzaldehyde, para dimethylaminobenzaldehyde and piperonaldehyde. Example of amides which have been found to be useful for modification of hydraulic cements include formamide and especially acetamide.

Suitable aldehyde and amide precursors may be used in the treatment of the present invention, typically those which give rise to aldehydes or amides under the alkaline conditions which are a characteristic of hydraulic cement environments. In particular, it has been found that presence of a certain amount of water and use of elevated temperatures may be desirable for production of aldehydes from some precursors. For example, addition of ethylene glycol to dry WPC gives rise to modification of hydrated products provided the ethylene glycol contains at least 5% v/v of water and treatment is carried out at a temperature of at least 110° C. Preferably, however, the hydraulic cements are treated according to the invention by addition of additives which ab initio comprise aldehydes and amides.

Hydration of the cement may be carried out in parallel with the additive treatment, e.g. by use of additive containing the required water, or by addition of water to the cement together with the additive. It has been found, however that satisfactory modification of properties is obtained with additives containing water usually only when the active aldehyde or amide component is of suitable water solubility, such as, for instance, formaldehyde and acetaldehyde. Furthermore, it has been found that prior addition of water to the cement generally blocks modification on subsequent treatment with aldehydes and amides.

Preferably the cement is pre-treated prior to hydration, for instance, by addition of substantially anhydrous additives, which may predominantly comprise aldehyde and/or amide or appropriate mixtures thereof, to the dry cement. Such addition of additive is usually accompanied by mixing, advantageously to bring about satisfactory dispersion of additive and cement. In some cases it may be desirable to present the active component of the additive to the cement in the form of a solution to assist dispersion, for instance when the aldehyde or amide active component is a solid under the conditions of treatment or when only small quantities of active component are being used. Suitable liquids for use as solvents in solution additives are preferably inert, volatile, organic solvents and solution additives comprising from about 1% to 50% by weight of aldehyde and amide active components in organic solvents, such as ethanol and carbon tetrachloride, have been used successfully.

A particularly preferred treatment according to the invention, however, comprises vapour phase pre-treatment of the cement, in which additive e.g. predominantly comprising aldehyde or amide, in the vapour phase, is intimately mixed with the cement grains, preferably substantially to coat the surfaces of the grains. For example, a dry gas stream comprising additive vapour and usually also inert carrier gas e.g. $N_2$, is passed through the cement clinker which is preferably subjected to agitation to assist mixing of the cement and vapour. In a fluidised bed application, the gas stream may in addition be employed to fluidise the cement particles. In practice it is envisaged that the vapour phase pre-treatment may be included as a stage within the scheme of production of the cement; for instance, cement particles may be passed directly from the final stages of the production process to a vapour phase contactor for treatment with additive vapour.

It has been found in some cases that the nature of the treatment employed may affect the modification obtained on subsequent hydration. For example, treatment of WPC with crotonaldehyde by the solvent pre-treatment method gives rise on subsequent autoclaving to a product having high tensile strength though substantially reduced dynamic Young's modulus as compared with untreated autoclaved WPC products; whereas similar products which have been vapour phase pre-treated with crotanaldehyde exhibit enhanced dynamic Young's moduli as well as improved tensile strength. Generally, also, conditions employed during treatment e.g. temperature, pressure etc. may affect the modification obtained, and thus choice of treatment regime and conditions employed may be varied having regard to the properties desired for the hydrated products.

The amount of aldehyde or amide active component which is employed for the treatment may be varied widely, higher levels of active component generally giving rise to greater extent of modification in the hydrated products. Substantial quantities e.g. up to about 50% or more by weight, of active component, based on the weight of untreated cement, may be used; though more usually up to about 15%, especially from about 1% or less up to about 10%, by weight of active component is used. The quantity of active component required to give a particular level of modification may depend upon the treatment method employed, direct admixture usually being the most inefficient method and vapour phase pre-treatment generally representing the most efficient use of active material. For example, it has been found that up-take of active aldehyde additive during prolonged vapour phase treatment e.g. 2–3 hours, amounts to only about 1% by weight or less of the dry cement prior to treatment.

Products which have been pre-treated with additive may be stored prior to use, at which time water is added to hydrate the cement. Generally the treated cement is sealed during storage to prevent premature hydration, for instance, on chance contamination by water vapour and/or carbon dioxide from the atmosphere. Pretreated products may be stored in slurry form e.g. for ease of bulk transportation, or in dried form, for instance in impermeable bags such as plastic bags.

In addition, it has been discovered that pre-treated products in particular those in slurry form, may in themselves exhibit desirable physical properties. For instance, slurries of WPC and fine grain Portland type cements with certain aldehydes e.g. acetaldehyde, have improved slump properties compared with water/cement mixes, and may also exhibit good plastic flow properties which may be utilised in particular applications of the cement material; for instance, plastic flow properties may be utilised in cement extrusion applications. Furthermore, it has been found that treatment of WPC and fine grain Portland type cements e.g. Swiftcrete or Rapid Hardening Cement, with salicylaldehyde, particularly in the absence of water, provides a material which is subject to a very rapid set e.g. less than about 1 minute, advantageously providing a quick-set cement which may be hydrated subsequently. Such pre-treated cement products and applications arising from their special properties are included within the scope of the invention.

Subsequent to the treatment of the invention or in parallel therewith, the cement may be hydrated to provide a hydrated cement composition product and such hydrated products are included within the scope of the invention. The conditions and methods employed for hydration are generally similar to those which are customarily employed and may include the use of elevated temperatures and pressures e.g. temperatures up to about 180° or 215° C. such as the conditions which are used during autoclaving. Indeed it has been found that with some aldehydes e.g. formaldehyde and crotonaldehyde, it may be desirable to use elevated temperatures e.g. 100°–130° C., preferably about 120° C., during combined additive treatment and hydration to obtain satisfactory modification of properties for hydrated products. Other aldehydes including salicylaldehyde, p-dimethylaminobenzaldehyde and butyraldehyde give satisfactory modification after hydration at room temperature. Generally, however, the level and type of modification obtained in the hydrated products may depend to some extent upon the conditions employed during hydration.

The treated hydrated cement products usually provide end products in themselves, though the treated hydrated cement gel may be used as a seed material for treatment of further batches of cement. For example, the treated cement powder, usually without further materials e.g. sand, aggregates or reinforcement, is hydrated and allowed to set, and the set product is finely ground for use as a modifier additive for further batches of cement.

Characteristically the hydrated cement products of the invention exhibit modified cement morphologies as compared with untreated hydrated cement products. A typical modified morphology comprises fibres which are clearly seen in scanning electron microscope (SEM) photographs of fracture surfaces at magnifications of about 1K up to about 10K e.g. about 5K. In comparison, SEM photographs of fracture surfaces of untreated hydrated WPC gels show no appreciable fibrous structure of comparable size at these magnifications. Examples of aldehydes and amides which have been found to give fibrous hydrated products with WPC are formaldehyde, actaldehyde, butyraldehyde, salicylaldehyde, p-dimethylaminobenzaldehyde, acrolein, formamide and acetamide. Other morphologies which have been produced include continuous 3-dimensional structures one of which appears as a "honeycomb" like structure, and another which appears to have the form of coral, in SEM photographs of fracture surfaces of hydrated products. For example, honeycomb structures have been produced in hydrated products after treatment with crotonaldehyde, preferably at elevated temperature, e.g. 120° C., and coral structures have been produced after treatment with p-chlorobenzaldehyde.

In parallel with modification of morphology, the hydrated products generally also exhibit modified physical strength properties as compared with untreated hydrated products. Advantageously the treated hydrated products have improved strength properties, though some products, notably those with almost completely fibrous morphologies, may be mechanically weaker than untreated hydrated cements. For example the tensile strength of the modified hydrated cement is often increased compared with untreated hydrated cement and tensile strengths of up to about 20 MN/m$^2$ e.g. 22 MN/m$^2$ have been recorded for treated hydrated products as compared with values of about 6–7 MN/m$^2$ for untreated hydrated products. The compression strength properties may also be improved, increases in compressive strength of as much as 2.5 or more times that of untreated hydrated cements often being achieved in practice. For example, treated hydrated products having compressive strength of as high as 125 MN/m$^2$ have been obtained as compared with values of about 40 MN/m$^2$ for untreated hydrated products, and values of about 100 MN/m$^2$ are common for treated hydrated products. Preferred treated hydrated products have tensile strengths of at least about 10 MN/m$^2$ and compressive strengths of at least about 60 MN/m$^2$. Advantageously, the hydrated cement products of the invention typically have improved strength properties as compared with hydrated OPC products which have undergone parallel aldehyde or amide treatment. Usually also the products of the invention tend to fracture in a progressive manner as compared with the more brittle fracture characteristics of untreated hydrated cements. Preferably the hydrated products of the invention have physical properties similar to those of fibre reinforced cement materials e.g. glass fibre reinforced cements, and thus may in some cases be considered as equivalent to "self-reinforced" materials.

The hydrated cement products of the present invention may be produced in a wide range of forms including those forms in which unmodified cement products, including reinforced products, are produced. The modified cement may be used in combination with other materials including aggregates such as crushed rocks, gravel, or sand to give products in the form of concretes or mortars. The products may also include introduced reinforcing elements such as steel rods and fibres in general. Such reinforced products may advantageously require less introduced reinforcement to achieve a given strength than similar unmodified cement products. The modified cements and concrete may be used for large and small structures alike and are particularly useful in applications where high tensile strengths are required.

In a preferred embodiment the modified cements may be used in the production of pre-cast units for use in the construction industry, in particular units of thin cross-section such as cladding panels and the like.

The modification of cement according to the invention is now described, by way of illustration only with reference to the accompanying photographs and diagram in which.

Figure 1:
FIG. 1 is an SEM photograph of a fracture surface of an untreated white Portland cement product which has been hydrated under normal circumstances.

An untreated white Portland cement (WPC, a low iron content Portland type cement containing less than about ½% by weight of iron, and having a Blain surface area of about 4,500 cm$^2$/g) product is prepared to be used as a comparison for treated products. 150 g. of dry WPC is mixed with 75 ml. of water and cast into 1"×½"×6" moulds and then cured for 24 hours at room temperature. The products are then hydrated under water for six days. FIG. 1 is an SEM photograph of a fracture surface of the resultant product, at a magnification of 1.1K. Such an untreated WPC product was found to have a tensile strength of about 6–7 MN/m$^2$ and a compression strength of about 40 MN/m$^2$.

Figure 2:
FIGS. 2–5 are SEM photographs of fracture surfaces of hydrated WPC products according to the invention.

EXAMPLE 1 p-dimethylaminobenzaldehyde 150 g. of WPC is mixed with a reagent consisting of 75 ml. of water and 37.5 g. of p-dimethylaminobenzaldehyde and cast into 1"×½"×6" moulds and heated for three hours at a temperature of 120° C. After this treatment the product is hydrated under water, at ambient temperature, for seven days. The product produced subsequent to hydration is examined by scanning electron microscopy, and is shown to have a fibrous morphology. FIG. 2 is an SEM photograph of a fracture surface of the product at a magnification of 1.1K. A similar sample which is prepared, containing 1% by weight of the additive on testing is found to have a compression strength of at least 60 MN/m$^2$ and a tensile strength of at least 10 MN/m$^2$.

Figure 3:

EXAMPLE 2 crotonaldehyde 150 g of WPC is mixed with a suspension of 37.5 ml. of crotonaldehyde with 32.5 ml. of water and cast into 1"×½"×6" moulds. The cement is thereafter treated and subsequently hydrated as in the foregoing example. FIG. 3 is an SEM photograph of a fracture surface of the resultant product at a magnification of 5.5K and appears as a dense "honeycomb" like structure. The compression and tensile strength of a similar product, containing 1% of the additive, are similar to those of the product obtained after treatment with p-dimethylaminobenzaldehyde as in Example 1.

Figure 4:
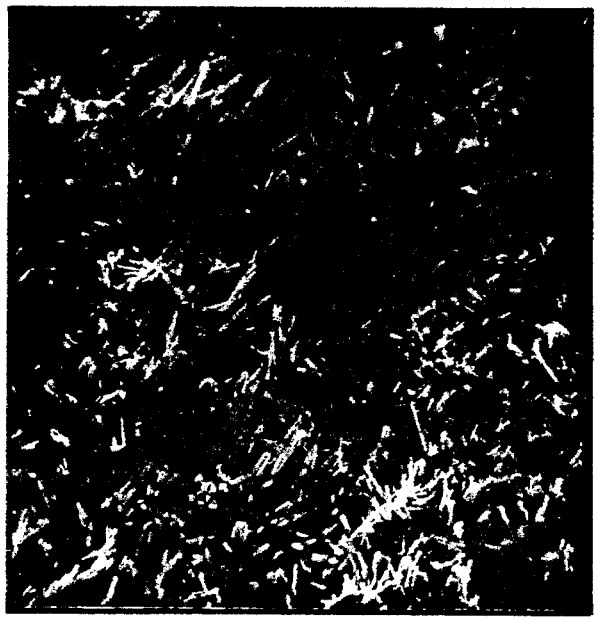

EXAMPLE 3 salicylaldehyde 150 g. of WPC is mixed with 75 ml. of a 50/50 mixture of water and salicylaldehyde, cast into $1'' \times \frac{1}{2}'' \times 6''$ moulds and left for three hours at room temperature. The cement is then hydrated under water at ambient temperature for seven days. An SEM photograph of the fracture surface of the product is given at FIG. 4. The magnification in this photograph is 1.1K and the product appears as a remarkable and highly fibrous material. The compression and tensile strengths of the product produced are slightly less than those of the untreated hydrated WPC product as in FIG. 1.

Figure 5:

EXAMPLE 4 p-chlorobenzaldehyde 150 g. of WPC is mixed with a solution of 37.5 g. of p-chlorobenzaldehyde in 75 ml. of water and cast into moulds as in previous examples. The cement is left for three hours at room temperature and then hydrated under water at ambient temperature for seven days. An SEM photograph of a fracture surface of the resultant product at a magnification of 1.2K is given at FIG. 5, and appears to have a coral like structure. A similar product, containing 5% of the additive, has a compression strength of at least 60 MN/m$^2$ and a tensile strength of at least 8 MN/m$^2$.

EXAMPLE 5 Use of preformed fibres 50 g. of WPC is slurried with 50 ml. of neat salicylaldehyde cast into $1'' \times \frac{1}{2}'' \times 6''$ moulds and hydrated for seven days under water. The hydrated products are then dried and crushed in a ball mill to pass a 120 μm sieve. The crushed fibrous product is added as 1% and 3% by weight additions to fresh dry WPC with mixing for 24 hours in a ceramic ball mill, and the mixture is then hydrated as in previous examples (cement/water ratio=0.4) and physical properties of hydrated products determined. After 28 days hydration products made with 1% addition of fibre are found to have average compression strengths of 90.5 MN/m$^2$ and average tensile strengths of 7.8 MN/m$^2$ and products made with 3% addition of fibre are found to have average compression strengths of 80.8 MN/m$^2$ and average tensile strengths of 7.25 MN/m$^2$.

EXAMPLE 6 Solution pretreatment

As an alternative to combined treatment and hydration as in previous examples, cement is pretreated with additives consisting of aldehyde or amide solutions in dry organic solvents (carbon tetrachloride or diethyl ether), subsequently hydrated and physical properties of hydrated products determined.

150 g quantities of dry WPC are slurried with 50 ml aliquots of additive solutions (20 g/l) for from 1 up to about 24 hours, after which solvent is removed by vacuum evaporation. The precoated cement samples are then mixed with water (0.4 w/c ratio) using a high speed shear blade mixer, cast into $1'' \times \frac{1}{2}'' \times 6''$ moulds and hydrated. The uniaxial compressive strengths and indirect tensile strengths of the samples are measured after periods of hydration ranging from 7 days up to 28 days. The results obtained are given below in Table 1, which includes information concerning quantities of additives used and conditions employed for treatment and hydration. The results clearly show that treatment of WPC with a range of additives according to the invention by the solution pretreatment method gives products having superior physical properties to untreated hydrated WPC products (i.e. tensile strength of about 6–7 MN/m$^2$ and compression strength of about 40 MN/m$^2$ for untreated hydrated products).

TABLE 1

Results obtained for hydrated WPC products pretreated by the solvent pretreatment method

| Additive | Hydration days | Additive Quantity % by wt. | Temp °C. | Compression Strength (MN/m$^2$) | Tensile Strength (MN/m$^2$) |
|---|---|---|---|---|---|
| Butyraldehyde | 7 | 1 | 20 | 48.09 | 11.99 |
| Cinnamaldehyde | 7 | 1 | 20 | — | 11.5 |
| o-Chlorobenzaldehyde | 7 | 5 | 20 | 37.67 | 8.46 |
|  | 28 | 5 | 20 | 57.22 | 8.23 |
| Piperonaldehyde | 7 | 5 | 20 | 47.47 | 10.44 |
|  | 28 | 5 | 20 | 64.45 | 9.43 |
| Salicylaldehyde | 7 | 1 | 20 | 49.0 | 12.76 |
|  | 14 | 1 | 20 | 56.0 | 10.58 |
| Acetamide | 7 | 5 | 20 | 48.06 | 11.48 |
|  | 28 | 5 | 20 | 79.0 | 5.82 |
| Formamide | 7 | 1 | 20 | — | 7.2 |

EXAMPLE 7 Treatment of WPC with crotonaldehyde and acrolein

Solvent and vapour phase pre-treatment techniques are used in the treatment of WPC with crotonaldehyde and acrolein.

Solvent pre-treatment is carried out as described in Example 6, and vapour phase pre-treatment is carried out as described below.

Figure 6:
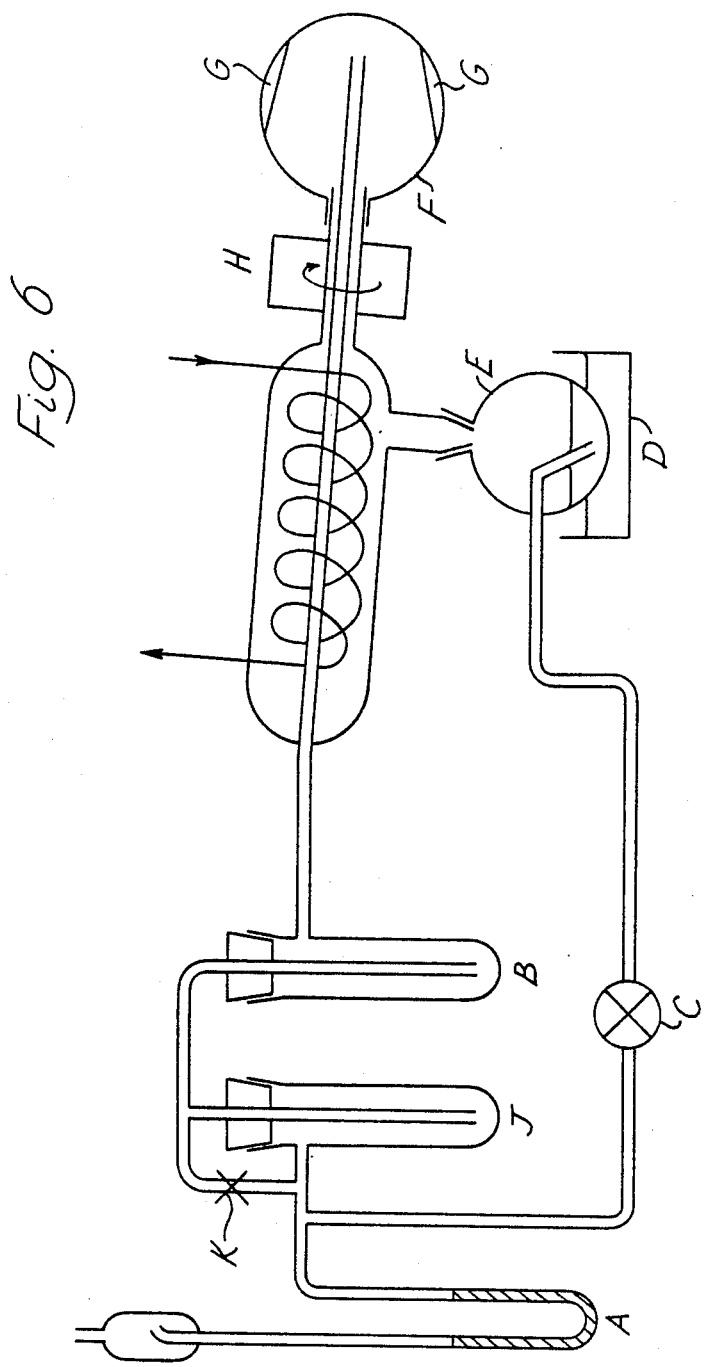
FIG. 6 is a diagrammatic representation of a vapour phase contactor for use for treating cement by the process of the invention.

With reference to FIG. 6, dry WPC powder is placed in a two liter round bottom flask F which has been modified by inclusion of a system of flutes G, and liquid additive is introduced into the side flask E. The apparatus is flushed through with dry nitrogen, the flask F and side flask E are then sealed to the apparatus, and the nitrogen circulated through the apparatus by means of the peristaltic pump C, any water vapour present in the N$_2$ being removed by a trap J which is cooled to −170° C. Trap J, containing any condensed water vapour is then isolated from the circulating system of the apparatus by suitable tap means K, and the water bath D surrounding side flask E is heated to evaporate the liquid additive. Whilst the additive is evaporated into the circulating nitrogen stream the flask F is set in motion rotating about its axis by drive means H e.g. an electric motor drive. The additive vapour mingles with the stirred WPC powder and the surface of the cement grains become coated with the additive. The vapour treatment is continued for from 2 to 3 hours after which the motor drive H is switched off and unabsorbed additive is collected by condensation at −170° C. in the second trap B. The treated cement is removed from the apparatus and stored in a dessicator prior to use.

Samples of the treated cements are mixed with 300 mesh silica and hydrated under autoclave conditions to give a cement mortar product. Subsequently the physical properties of hydrated products are determined. The results obtained are given in Table 2 which indicates the treatment and hydration regimes employed for each sample. The results clearly show the anomalous properties of vapour and solution pre-treated products using crotonaldehyde particularly in terms of the dynamic Young's modulus measurement.

TABLE 2
Typical Properties of Modified White Portland Cement

| Experiment | Compressive strength MN/m$^2$ | 3-Point Flexural strength MN/m$^2$ | Impact strength KJ/m$^2$ | Dynamic Young's Modulus MN/m$^2$ × 10$^3$ |
|---|---|---|---|---|
| WPC/300 mesh SiO$_2$ (blank) | 104 | 13 | 15 | 19 |
| (1) WPC/300 mesh SiO$_2$ + crotonaldehyde | 86 | 23 | 17 | 24 |
| (2) WPC/300 mesh SiO$_2$ + crotonaldehyde | 125 | 17* | 20 | <1 |
| (3) WPC/300 mesh SiO$_2$ + acrolein | 103 | 13 | not measured | |

*Measured as tensile strength.

The details of the experimental conditions used are as follows:

The cement/silica ratio was 1.5, the water/cement ratio was 0.34, and hydration was achieved in an autoclave at 180° C. for seven hours. Comparable results can probably be obtained with room temperature hydration over a longer period. In Experiments (1) and (3) the organic additive was incorporated in the dry cement at a level of ~1% by weight of cement by vapour phase pre-treatment, and in Experiment (2) the additive was incorporated by the solvent pretreatment technique at a 10% by weight level. The Brazilian method was used to give indirect tensile strengths, whilst the impact strengths were obtained by Izod technique. All of the measured properties were consistent and reproducible.

EXAMPLE 8 Ultra-Rapid Hardening cement

A modified hydrated cement product is also prepared from a fine grain Portland type cement by the additive treatment of the invention.

Figure 7:
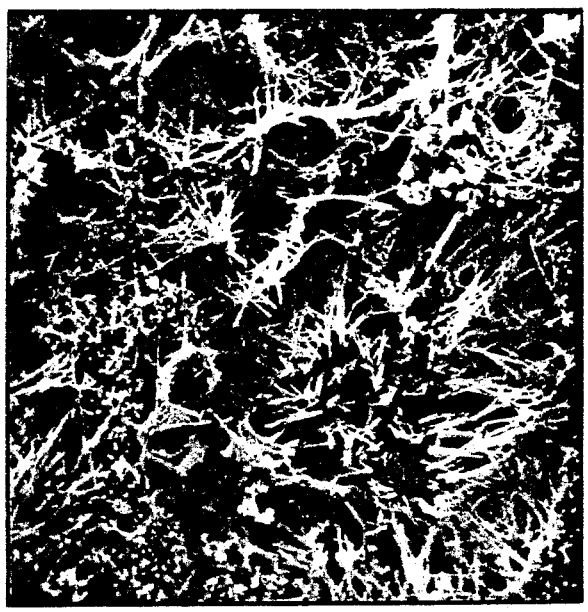
FIG. 7 is an SEM photograph of a fracture surface of a hydrated fine grain Portland type cement according to the invention.

150 g of Ultra Rapid Hardening cement (a fine grain Portland type cement material having a Blain surface area of about 10,000 cm$^2$/gm) is mixed with an additive consisting of 75 ml of water and 25 ml of salicylaldehyde and, after stirring, is cast in 1"×½"×6" moulds and allowed to set at room temperature. After 24 hours the set products are removed from the moulds and hydrated under water at ambient temperature for 7 days. Fracture surfaces of the hydrated products are examined by scanning electron microscopy and are found to have modified fibrous morphologies as compared with untreated hydrated products, as shown in FIG. 7 which is a SEM photograph of a treated hydrated product at a magnification of 1.5K. SEM photographs at the same magnification of fracture surfaces of untreated hydrated products show no significant fibrous structure, and appear similar to the SEM photograph of untreated hydrated WPC shown in FIG. 1, except for differences due to finer particle sizes. The compressive and tensile strengths of the treated hydrated products are also determined and found to be no less than, and in many cases substantially greater than, those of untreated hydrated Ultra Rapid Hardening cement products (e.g. compressive strengths of about 60 MN/m$^2$ and tensile strengths of about 10 MN/m$^2$ for treated hydrated products.)

Similarly other aldehyde and also amide additives are used to treat fine grain Portland cement type materials with similar effects on the morphologies and physical properties of hydrated products.

EXAMPLE 9 Extrudable cement composition

WPC is treated with acetaldehyde to provide an extrudable cement composition which may be formed by extrusion processes into shaped products which retain their shape on subsequent hydration.

100 g of WPC is mixed with 100 ml of cooled acetaldehyde to provide an extrudable cement composition in the form of a coloured plastic mass. This composition is then extruded through a nozzle to give a shaped product which is then hydrated under water at ambient temperature for 7 days. The hydrated product retains its original, extruded shape, the colour of the extrudable cement composition being lost during hydration. In variations of the above method up to 40% by volume of water is added to the acetaldehyde and gives an extrudable cement composition which has satisfactory plastic properties for extrusion purposes.

EXAMPLE 10 Quick-Set cement composition

Addition of dry salicylaldehyde to WPC gives a cement composition which sets into a hard mass after a very short period of time and may be hydrated subsequently to give a hydrated product. This "quick-set" cement composition may be used where a rapid-setting cementing material is required having the additional benefits of the strength and durability properties of a hydrated cement product: for instance for use in sealing leaks in submerged structures or water pipes.

150 g of WPC is mixed with 110 ml of dry salicylaldehyde to form initially a fluid mixture which, however, begins to stiffen after about 60 seconds and sets firm after about 70 seconds. In variations of the above method the proportion of cement used is increased resulting in a faster set.

The set product produced as a result of the additive treatment is mechanically strong and is slightly expanded in size. The set product is then hydrated for 7 days under water at ambient temperature to give a hardened cement product having properties similar to those of normal hydrated cement products.

I claim:

1. A modified hydraulic cement product comprising a hydraulic calcium silicate-based cement having a Blain surface area of at least 3,000 cm$^2$/g and/or an iron content of less than 2.5% by weight expressed in terms of the ferric oxide content of the dry cement, in which the cement has been treated with an additive comprising a monoaldehyde under the alkaline conditions prevailing in the cement before or during the setting reaction.

2. A product according to claim 1, in which the cement is a Portland type cement.

3. A product according to claim 1 or 2, in which the cement has a Blain surface area greater than about 4,500 cm$^2$/g.

4. A product according to claim 3, in which the cement comprises a finely ground Portland type cement material.

5. A product according to claim 1 or 2, in which the cement contains less than about 1% by weight of iron.

6. A product according to claim 5, in which the cement comprises a low iron content Portland cement type material.

7. A product according to claim 1 or 2, in which the cement has been treated with formaldehyde, paraformaldehyde, acetaldehyde, butyraldehyde, heptaldehyde, acrolein, crotonaldehyde, cinnamaldehyde, salicylaldehyde, ortho or para chlorobenzaldehyde, para dimethylaminobenzaldehyde, or piperonaldehyde.

8. A product according to claim 1 or 2, in slurry form or in dried form.

9. A product according to claim 8 comprises an extrudable cement slurry, in which the cement has been treated with a monoaldehyde.

10. A product according to claim 1 or 2 comprising a quick-set cement composition, in which the cement has been treated with salicylaldehyde in the absence of water.

11. A product according to claim 1 or 2, comprising a hydrated cement product, in which the cement has been hydrated subsequent to or in parallel with the additive treatment.

12. A product according to claim 11, consisting of hydrated cement gel in finely ground form for use as a modifier additive for cement.

13. A product according to claim 11, having a modified cement morphology.

14. A product according to claim 11, having a tensile strength of at least 10 MN/m$^2$ and a compressive strength of at least 60 MN/m$^2$.

15. A product according to claim 11, in the form of a pre-cast unit for use in the construction industry.

16. A process for the production of a modified hydraulic cement product comprising treating a hydraulic calcium silicate-based cement having a Blain surface area of at least 3,000 cm$^2$/g and/or an iron content of less than 2.5% by weight expressed in terms of the ferric oxide content of the dry cement with an additive comprising a monoaldehyde under the alkaline conditions prevailing in the cement before or during the setting reaction.

17. A process according to claim 16, in which the cement comprises a fine grain Portland type cement having a Blain surface area greater than about 4,500 cm$^2$/g, or a low iron content Portland type cement containing less than about 1% by weight of iron expressed in terms of the Fe$_2$O$_3$ content of the dry untreated cement material.

18. A process according to claim 16 or 17, comprising treating the cement with formaldehyde, para formaldehyde, acetaldehyde, butyraldehyde, heptaldehyde, acrolein, crotonaldehyde, cinnamaldehyde, salicylaldehyde, ortho or para chlorobenzaldehyde, para dimethylaminobenzaldehyde, or piperonaldehyde.

19. A process according to claim 16 or 17, comprising treating the cement with a simple aliphatic monoaldehyde.

20. A process according to claim 16 or 17, comprising treating the cement with an unsaturated monoaldehyde.

21. A process according to claim 20, comprising treating the cement with an unsaturated monoaldehyde in which the unsaturation is conjugated with respect to the aldehyde carbonyl group.

22. A process according to claim 16 or 17, in which the additive ab initio comprises a monoaldehyde.

23. A process according to claim 16 or 17, in which additive in the form of a solution in an inert volatile organic solvent is contacted with the cement.

24. A process according to claim 16 or 17, in which additive in the vapour phase is intimately mixed with the cement grains.

25. A process according to claim 16 or 17 in which from less than about 1% to about 10% by weight of monoaldehyde is used.

26. A process according to claim 16 or 17, in which a treated product in slurry form is subjected to extrusion processes.

27. A process according to claim 16 or 17, in which the cement is hydrated subsequent to or in parallel with the additive treatment.

28. A process according to claim 16 or 17, in which the modified cement is used in combination with other materials.

29. A process according to claim 16 or 17, in which products are made in the form of pre-cast units for use in the construction industry.

* * * * *